(12) United States Patent
Tancredi et al.

(10) Patent No.: US 8,322,394 B2
(45) Date of Patent: Dec. 4, 2012

(54) APPARATUS FOR CONNECTING TUBULAR CORES

(75) Inventors: Antonio Tancredi, Lamporecchio (IT);
Stefano Benvenuti, Lamporecchio (IT);
Alessandro Niccolai, Larciano (IT)

(73) Assignee: Ga. Vo. Meccanica S.N.C., Larciano (IT)

( * ) Notice: Subject to any disclaimer, the term of this patent is extended or adjusted under 35 U.S.C. 154(b) by 382 days.

(21) Appl. No.: 12/530,632

(22) PCT Filed: Mar. 17, 2008

(86) PCT No.: PCT/IB2008/000618
§ 371 (c)(1),
(2), (4) Date: Sep. 21, 2009

(87) PCT Pub. No.: WO2008/114115

PCT Pub. Date: Sep. 25, 2008

(65) Prior Publication Data

US 2010/0032099 A1    Feb. 11, 2010

(30) Foreign Application Priority Data

Mar. 16, 2007  (IT) .................. PI2007A0030

(51) Int. Cl.
| | |
|---|---|
| *B32B 38/00* | (2006.01) |
| *B32B 38/04* | (2006.01) |
| *B65C 3/12* | (2006.01) |
| *B65C 3/16* | (2006.01) |
| *B65C 9/04* | (2006.01) |
| *B65C 9/06* | (2006.01) |

(52) U.S. Cl. ........ 156/447; 156/446; 156/448; 156/449; 156/450; 156/510; 156/516; 156/517; 156/522; 156/523; 83/109; 83/111; 83/112

(58) Field of Classification Search .................. 156/510, 156/516, 517, 522, 523, 446–450; 83/109, 83/111, 112, 162, 163, 730
See application file for complete search history.

(56) References Cited

U.S. PATENT DOCUMENTS 8,042 A * 4/1851 Robbins ..................... 83/730
(Continued)

FOREIGN PATENT DOCUMENTS
| | | |
|---|---|---|
| JP | 48 092477 | 11/1973 |
| WO | 2004 087551 | 10/2004 |
| WO | 2006 048496 | 5/2006 |

*Primary Examiner* — Mark A Osele
*Assistant Examiner* — Christopher C Caillouet
(74) *Attorney, Agent, or Firm* — Dennison, Schultz & MacDonald

(57) ABSTRACT

An apparatus for connecting and cutting tubular cores (1) for supporting rolls of wound material comprising a loading station (80), comprising a rolling cradle consisting of two parallel and horizontal rollers (10 and 11), a star-shaped driven supplier (4), having, for example, four continuous protrusions (2) that allow to load tubular cores of different lengths. The rollers (10 and 11) of the rolling cradle are arranged along a longitudinal direction (16). The apparatus comprises a pusher (5) that acts against a rear end of the core (1), once it has been loaded on the rolling cradle (10, 11), in order to bring a front end of a loaded core in a connecting station (60) where it is present the rear end of a core portion to connect, loaded previously. The pusher (5) comprises an approaching element (9) with vertical idle rollers (7 and 8). Downstream of the loading station (80) a taping station (60) is present and a transmission roller (62) bridging the two cores is capable of transmitting the moving rotation between the core portion and the core. A conveying station (50) a cutting station (30) and a sliding suction abutment (70) are present downstream. The apparatus has the peripheral dragging means (30) equipped with a device for transmitting a number of rotations suitable for causing said core and said core portion to rotate for a predetermined number of turns.

12 Claims, 4 Drawing Sheets

U.S. PATENT DOCUMENTS

| | | | | |
|---|---|---|---|---|
| 3,074,605 | A | * | 1/1963 | Shaw ............... 414/746.3 |
| 3,260,390 | A | * | 7/1966 | Morain ............. 414/432 |
| 3,322,291 | A | * | 5/1967 | Smith ............... 414/432 |
| 4,743,065 | A | * | 5/1988 | Meiller et al. ..... 297/300.3 |
| 5,956,923 | A | * | 9/1999 | Andros et al. ..... 53/397 |
| 6,453,966 | B1 | | 9/2002 | Ostroff |
| 2006/0180696 | A1 | * | 8/2006 | Nilsson ............. 242/520 |

\* cited by examiner

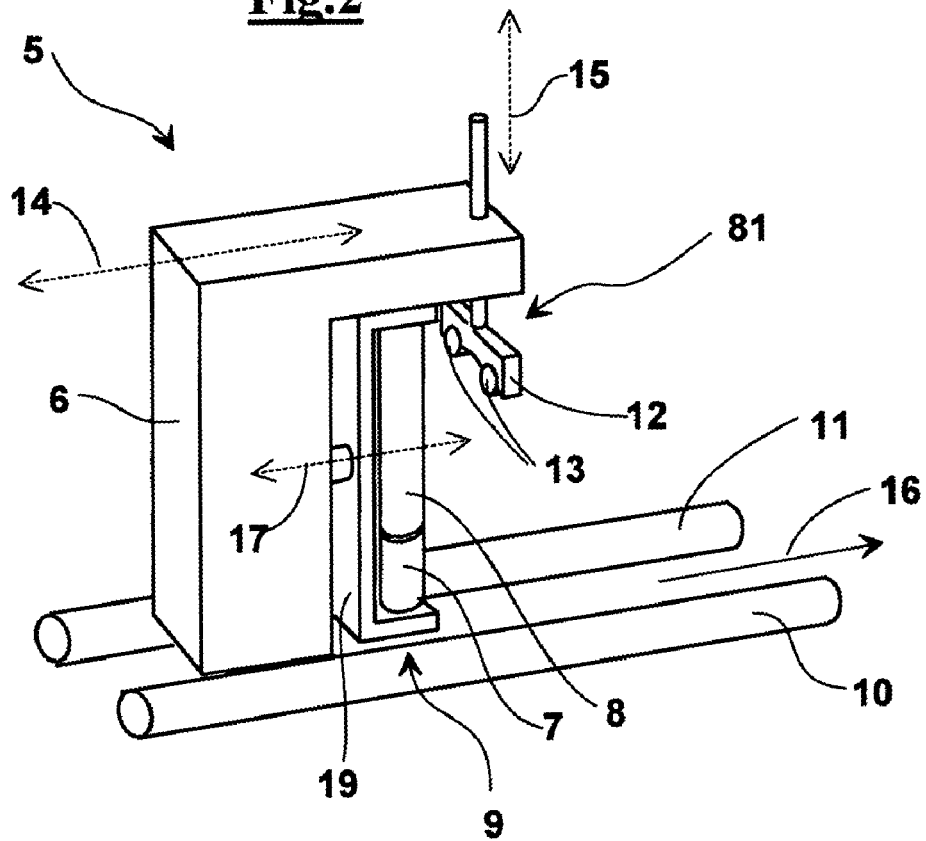
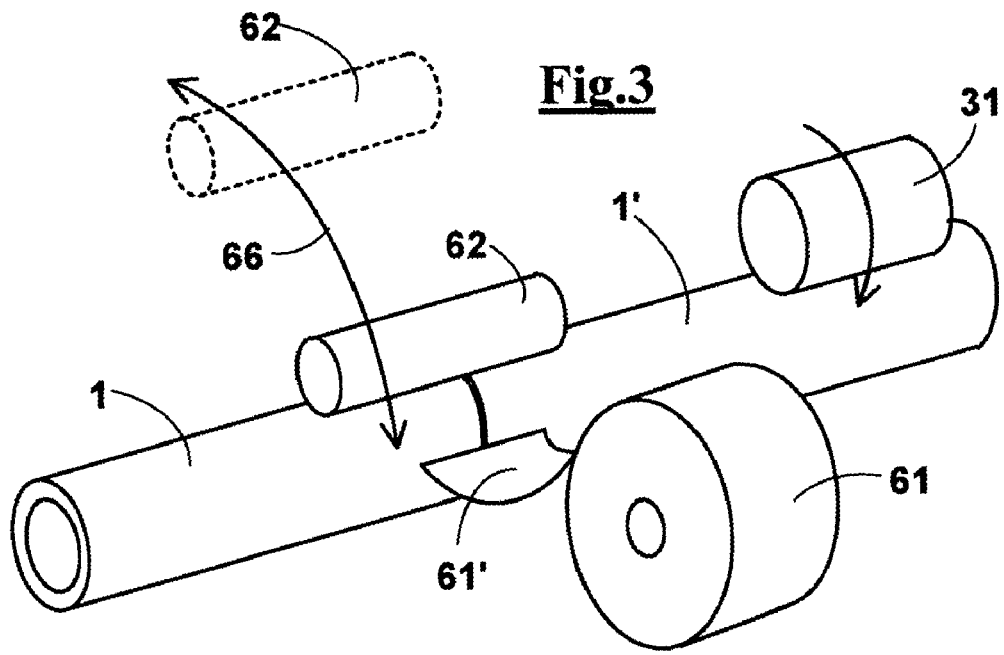

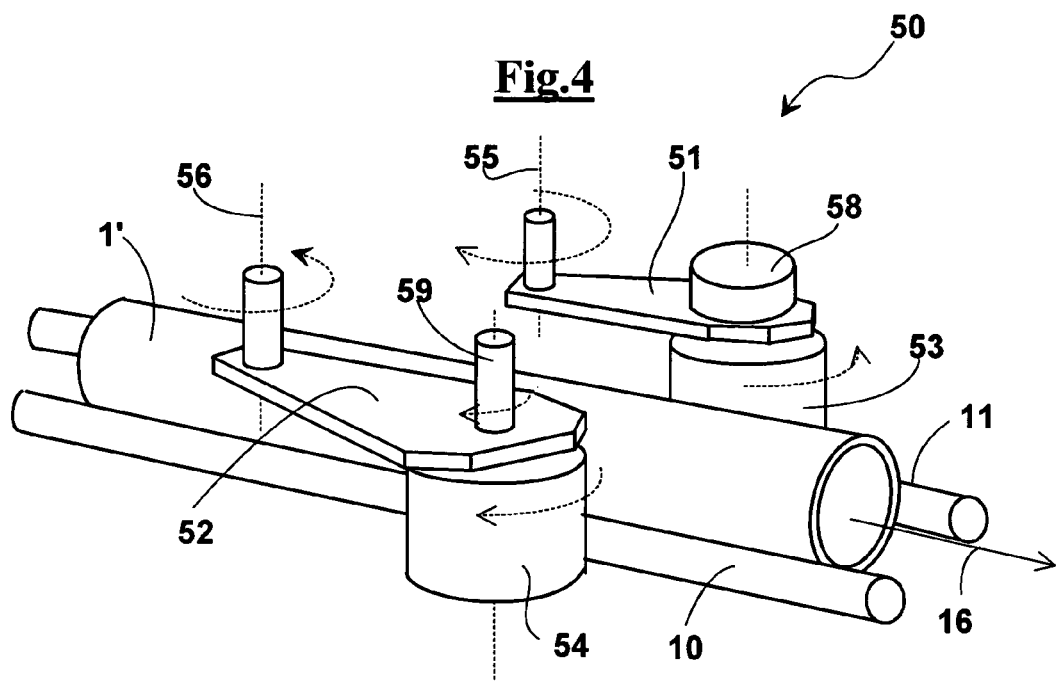
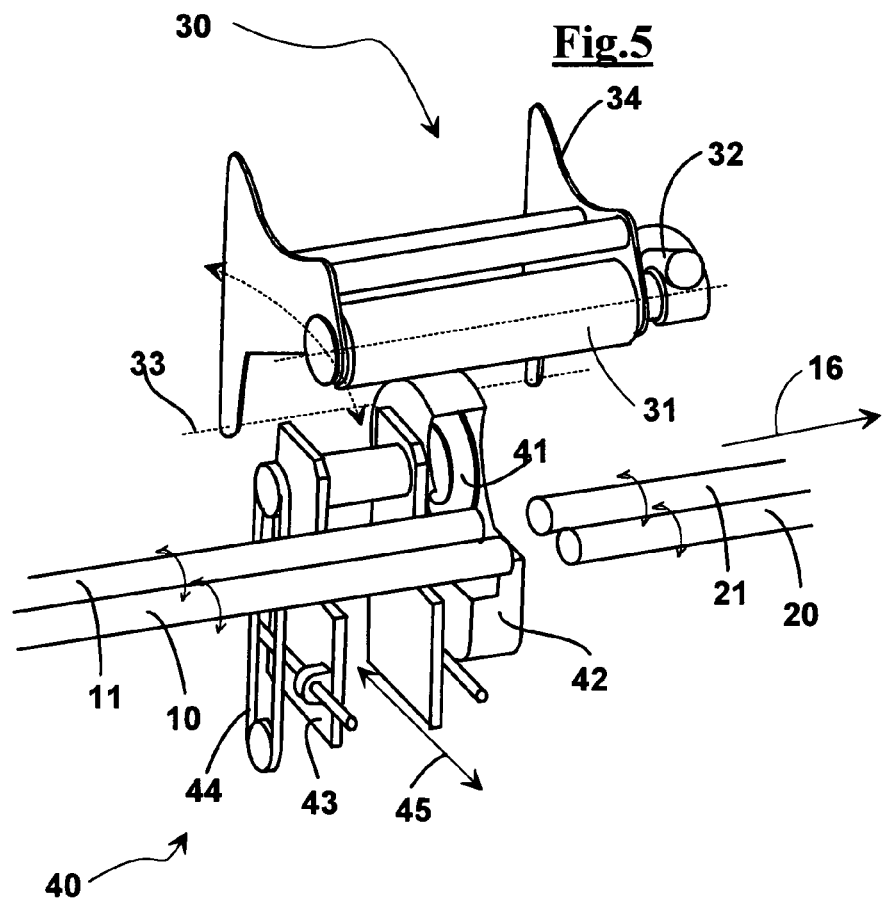

APPARATUS FOR CONNECTING TUBULAR CORES

FIELD OF THE INVENTION

The present invention relates to a machine capable of connecting two tubular cores arranged in succession with facing ends and to cut a resulting jointed core according to a desired length.

DESCRIPTION OF THE TECHNICAL PROBLEM

Machines are known capable of connecting to each other two tubular cores arranged in succession with facing ends so that a front end of a previous core is arranged against a rear end of a next core, and such that a butt joint is formed by winding one or more layers of adhesive tape. The step of winding the adhesive tape is carried out approaching a free end thereof bridging the two adjacent cores in turn, at the butt joint. Then, the core downstream is caused to rotate, and its movement is transmitted to core upstream by an idle rubber roller arranged bridging the two cores, such that the two cores rotate about themselves dragging the adhesive tape and creating the butt joint.

The drawback of this known system is that it is not possible to evaluate exactly the number of turns of adhesive tape wound about the cores, thus creating joints always different from each other and then with different resistance characteristics.

In fact, since the two cores in turn are caused to rotate by a peripheral dragging driven roller while they are supported by a couple of idle rollers, since the diameter of the cores to connect is frequently changed, the ratio between the rotation of the cores and the rotation of the peripheral dragging roller cores to connect is different for each diameter.

While on the one hand a too low number of layers of adhesive tape generates a weak joint, on the other hand advisable to exceed with the number of layers of adhesive tape, since a thickness would form that would change the diameter affecting the use of the core.

SUMMARY OF THE INVENTION

It is then a feature of the present invention to provide an apparatus for connecting with adhesive tape and cutting roll supporting tubular cores, adapted to obtain joints equal to each other for all the cores of the same diameter, i.e. with an equal number of layers of adhesive tape for any diameter of the cores.

It is another feature of the invention to provide an apparatus improved for feeding the cores in order to increase the core alignment precision in a joint zone.

Another feature of the invention is to provide an apparatus for feeding the cores that has a core feeding system that assists loading the cores and ensures that only one core at a time is loaded.

Another feature of the invention is to provide an apparatus for feeding the cores that has a high precision system for locating the core portions to connect.

A further feature of the invention is to provide an apparatus for feeding the cores that allows a completely automatic operation of the joints and of the cut for any diameter of the cores.

These and other objects are achieved by an apparatus for connecting and cutting roll supporting tubular cores, comprising:

means for feeding said cores adapted to position one of said cores on a rolling cradle, said core having a front end and a rear end;

means for pushing said core along a longitudinal axis along said cradle, said means for pushing acting against said rear end in order to bring said front end in a connecting station, in said connecting station the rear end of a core portion to connect being arranged;

a peripheral driven dragging means for causing said core portion to rotate;

connecting means present in said connecting station, comprising a supplier of adhesive tape and a transmission roller for causing said core and said core portion to rotate about their own axis, maintaining the front end of said core and the rear end of said core portion integral to each other, in order to drag said adhesive tape to wind and form said joint;

conveying means for conveying longitudinally said connected core and core portion along said longitudinal axis up to a cutting station, said conveying means causing said connected core and core portion to proceed until the front end of said core portion has not passed said cutting station for a predetermined distance;

cutting means for cutting said core and said core portion connected to each other in said cutting station in order to obtain a core length that is long as said distance;

characterised in that to said peripheral dragging means a device for transmitting a number of rotations is associated suitable for causing said core and said core portion to rotate for a predetermined number of turns.

In particular, said device for transmitting a number of rotations comprises:

means for sensing the diameter of said core;

computing means for computing said predetermined number of turns, responsive to said diameter;

means for setting said peripheral dragging means according to a signal provided by said computing means.

In particular, in said computing means program means are resident for:

detecting a number N of layers of adhesive tape to wind about said core joint;

computing a number n of turns to input in the peripheral dragging means by the equation $n=N*D/d$, where d is the diameter of the peripheral dragging means, D is the diameter of the core communicated from said means for sensing;

transmitting said number n to said means for setting so that they trigger dragging the core and stop it to achieve said number n of turns.

Preferably, said transmission roller in said connecting station is mounted on a support that can be approached/moved away from said core joint. In particular, said support is selected from the group comprised of:

a driven support, for bringing automatically the transmission roller to contact said core joint;

manually operated support, for bringing manually the transmission roller to contact said core joint.

Preferably, said means for sensing the diameter of said core is selected from the group comprised of:

means for reading automatically a measurement of the diameter;

acquisition means for acquiring a measurement data of the predetermined diameter;

a combination of means for reading automatically and acquisition means, wherein testing means are provided for testing that the predetermined diameter coincides with the diameter read automatically.

Advantageously, said longitudinal conveying means comprises two auto-centering rollers arranged at opposite sides with respect to said core portion, pivotally mounted on respective supports adapted to bring them to close on said core portion pushing laterally said core portion and engaging it, and to bring them to open disengaging it, a first roller of said rollers being a driven roller and a second of said rollers being a idle roller, said supports being adapted to be closed and opened through actuating means, to at least one of said rollers an encoder being associated for measuring precisely the conveying movement for the connecting and/or the cutting steps.

In a preferred exemplary embodiment, each of said supports adapted to close pushing laterally said core engaging it and to open disengaging it comprises an arm rotating about an axis having a free end connected to a respective roller of said rotating rollers.

Advantageously, said means for reading automatically a measurement of the diameter of said cores comprises a sensor of angular position mounted on the axis of one of said rotating arms, in particular, said sensor of angular position is mounted on the axis of rotation of the rotating arm that holds said idle roller.

In particular, said sensor of angular position is a potentiometer.

Advantageously, said second driven roller is wheeled by an electric motor selected from the group comprised of:
a gear motor with asynchronous motor;
a step motor.

In particular, said two auto-centring rollers are coated of Vulcolan.

Advantageously, said peripheral dragging means comprises:
a movable support radially with respect to said cores;
a rubber roller pivotally connected to said mobile support, the axis of rotation of said rubber roller being parallel to the axis of the cores,
a motor for causing said rubber roller to rotate about its axis of rotation, according to a predetermined number of turns;
motor means for moving said movable support for bringing said rubber roller into contact with the side surface of said cores.

Advantageously, said supplier of adhesive tape comprises a sensor for detecting the presence of adhesive tape.

Advantageously, said cutting station comprises:
a sliding carriage in a transversal direction with respect to said longitudinal direction;
a toothed circular blade arranged perpendicularly to said longitudinal direction mounted on a support mounted on said carriage;
means for moving said sliding carriage;
means for causing said circular blade to rotate.

In particular, said means for moving said sliding carriage comprises a hydraulically controlled speed cylinder.

Advantageously, said means for moving said carriage comprises means to obtain a quick approaching stroke and a slow cutting stroke.

Advantageously, said cutting station comprises a position sensor adapted to measure the position of said sliding carriage, in a transversal direction.

Advantageously, in said cutting station means are provided for reversing the speed of rotation of the core during the cut after that the core has rotated of a predetermined angle. This way, it is possible to obtain a very high cut finishing.

In particular, said predetermined angle is higher than 360°, in particular is set between 380-390°.

In particular, said means for causing said circular blade to rotate comprises a asynchronous motor.

Advantageously, abutment means are provided for stopping the front end of said core portion in a predetermined position when cutting.

In particular, said abutment means comprises:
an abutment carriage sliding in longitudinal direction;
an abutment element mounted on said abutment carriage and arranged perpendicularly to said longitudinal direction;
means for moving said abutment carriage.

In particular, said abutment element is plane.

In particular, said abutment carriage comprises a position sensor.

Preferably, said abutment means comprises chip suction means for chips produced by the cutting.

In particular, said suction means comprises a suction duct that has origin in an opening suction obtained on said abutment element.

In particular, said means for feeding said cores comprises:
an elongated body with star-shaped cross section extending along an axis of rotation parallel to said longitudinal axis, said star-shaped body comprising at least three continuous radial protrusions;
motor means for causing said star-shaped shaft to rotate about said axis of rotation.

Advantageously, said protrusions extend for all the length of said star-shaped shaft.

In particular, said star-shaped shaft comprises four radial continuous protrusions arranged in succession with facing ends at a right angle to each other. The fact that the radial protrusions are continuous allows to feed or load cores of variable length between a few centimeters to the whole length of the star-shaped shaft.

In particular, said rolling cradle on which said feeding means locate one of said cores comprises two idle rollers arranged parallel to the longitudinal axis of said star-shaped shaft, said idle rollers being mounted at a height less than said longitudinal axis of said star-shaped shaft, so that after a predetermined rotation of said star-shaped shaft a core is released on said cradle.

In particular, said means for pushing said cores longitudinally along said cradle comprises a sliding driven carriage along the longitudinal axis of said cores, said carriage carrying out a first approaching stroke.

In particular, said means for pushing comprises furthermore:
an approaching device operatively into contact with the rear end of said core and mounted on said carriage, comprising an actuator movable with respect to said carriage along said longitudinal axis for carrying out a further approaching fine stroke.

In particular, said approaching device comprises at least two aligned small idle rollers having axis of rotation perpendicular to the longitudinal axis of said cores, said rollers being operatively into contact with said rear end.

Advantageously, means are provided for pushing said core against said rolling cradle, comprising a vertical pushing device acting against said core opposite to said cradle. The means for pushing have the function of keeping in line the tubular cores longer during the rotation causing them to rotate about its own axis and keeping them to adhere to the cradle.

In particular, said vertical pushing device comprises:
a fork sliding radially with respect to the core having a free end oriented towards the core, said free end comprising at least two small idle rollers that can be brought in rotation by the rotation of said core;
motor means for moving radially said fork.

In particular, said motor means are selected from the group comprised of:
- a pneumatic linear actuator;
- a hydraulic linear actuator;
- an electric motor.

Advantageously, said apparatus comprises means for actuating and for controlling the movement of said means for feeding, of said means for pushing, of said connecting means and of said conveying means.

BRIEF DESCRIPTION OF THE DRAWINGS

The invention will be made clearer with the following description of an exemplary embodiment thereof, exemplifying but not limitative, with reference to the attached drawings wherein:

FIG. 2 shows in detail a pusher of such an apparatus;

FIG. 3 shows diagrammatically the operation of the taping station according to the invention where the transmission roller is located bridging a portion previously arranged on the cradle and a core to connect;

FIG. 4 shows a station for dragging such an apparatus;

FIG. 5 shows a cutting station of such an apparatus;

DESCRIPTION OF PREFERRED EXEMPLARY EMBODIMENTS

Figure 1:
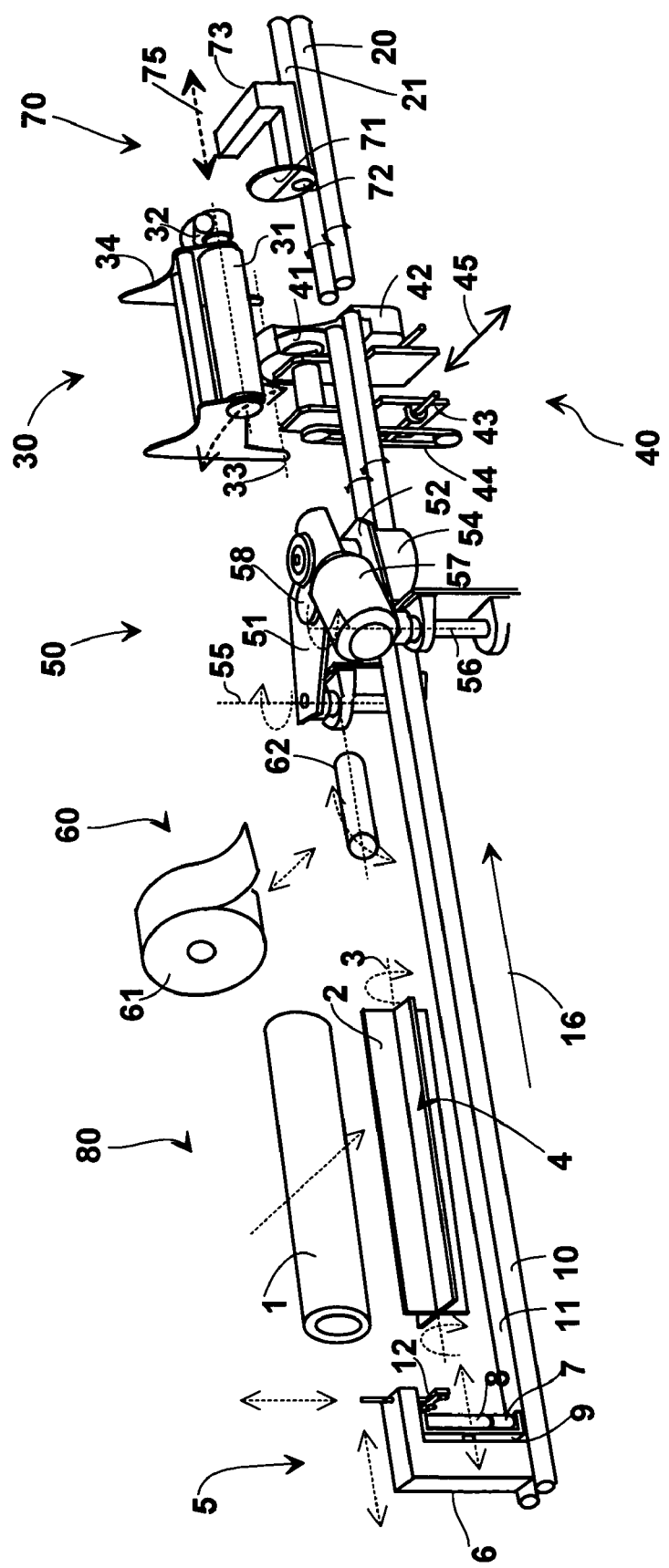
FIG. 1 shows an example of an apparatus, according to the invention, for connecting and cutting roll supporting tubular cores.

With reference to FIG. 1, an apparatus is described for connecting and cutting tubular cores 1 for supporting rolls of wound material. Such an apparatus comprises a loading station 80, having core feeding means 1 adapted to position a core at a time on a rolling cradle consisting of two parallel and horizontal rollers 10 and 11. The feeding means comprises a star-shaped driven supplier 4, having, for example, four continuous protrusions 2 that allow to load tubular cores of different lengths. The fact that the protrusions 2 are continuous allows loading tubular cores 1 of lengths that must be from a few centimeters up to the maximum length, without manual adjustment.

The rollers 10 and 11 of the rolling cradle are arranged along a longitudinal direction 16, as also the axis of the cores during the work and the handling direction the cores same. The apparatus comprises means for pushing cores 1 along the longitudinal direction 16, in particular, a pusher 5 that acts against a rear end of the core 1, once it has been loaded on the rolling cradle 10,11, in order to bring a front end of a loaded core successively to a connecting station 60. In this station the rear end of a core portion 1' to connect is present, previously loaded.

As shown in FIG. 2, the pusher 5 comprises a carriage 6 sliding in longitudinal direction 16, on a guide not shown, and an approaching element 9, for example pneumatic, with adjustable pressure and with vertical idle rollers 7 and 8. These rollers, being operatively into contact with the rear end of the loaded core, then allow the free rotation of the core same about its axis, gripping it with approaching element 9 during the rotation. The vertical idle rollers 7 and 8 are mounted on a bracket 19 movable according to arrow 17 in longitudinal direction 16 with respect to the pusher 5 by a piston not shown.

The pusher 5 comprises furthermore a vertical pushing device 81, with two small idle rollers 13 mounted on a fork 12, having the function of keeping in line the tubular cores longer during the connecting step. Often, in fact, long cores are slightly bent and, rotating without the action of the pusher 81 risk to hit on the idle rollers 10 and 11 up to fall from the cradle. This pusher 81 forces the core 1 to rotate about its axis. The pusher 81 is activated by a control software only when long cores are made and only when the loading step is effected by the automatic loading unit.

In the present invention, the loading can be carried out in a manual way, alternatively, to an automatic loading. If the loading step is effected by the loading unit manually the core has normally a smaller length and then is not bent significantly, therefore a pusher 81 is not necessary.

With reference also to FIG. 2, the apparatus according to the invention comprises connecting means, forming a connecting station of known type 60. The connecting means comprises a supplier of adhesive tape 61 and a transmission idle roller 62. A peripheral dragging means 31 causes the core portion 1' to rotate about its own axis and also the core 1 to rotate about its own axis integrally to portion 1'. The transmission idle roller 62 can be lowered in the direction of arrow 66 maintaining indirectly the front end of said core 1 and the rear end 1' of said core portion to contact each other. This way, the effect is obtained of dragging the free end 61' of the adhesive tape 61 to wind and form said joint.

According to the present invention the peripheral dragging means 31 is programmed by an algorithm software for keeping constant the tape turns, whichever is the diameter of the core 1, 1'. The diameter and the thickness of the core 1 are chosen by the operator on control panel of the machine, not shown in the figure. In this station a sensor, not shown, has been installed which detects if the adhesive tape 61 is finished (tape presence sensor) and blocks the machine warning the operator to provide the adhesive tape 61.

Figure 7:
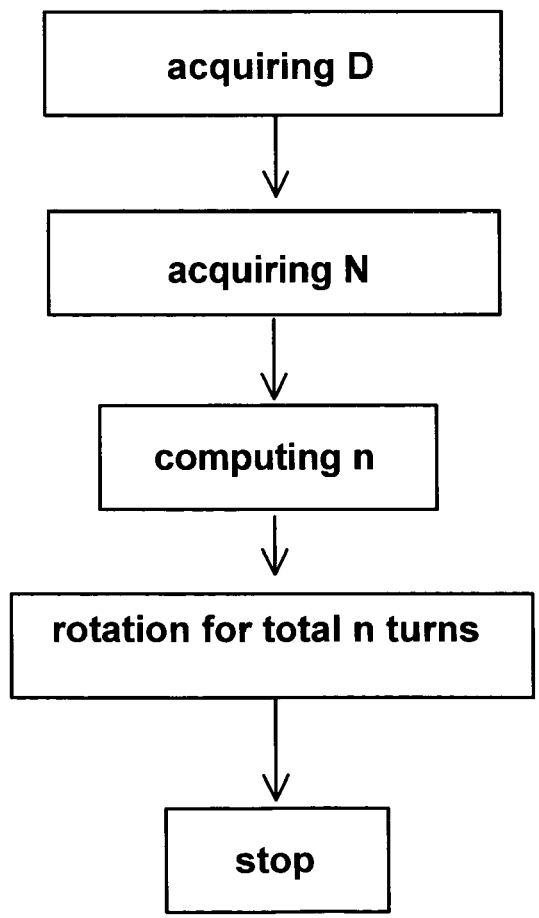
FIG. 7 shows a flow-sheet that describes the operation of the apparatus according to the invention for transmitting a predetermined number of turns of the core taping station.

Such algorithm, as shown in FIG. 7, computes the number of turns of the peripheral dragging means, acquiring the number N of layers of adhesive tape to wind about the cores and the number n of turns to input in the peripheral dragging means by the equation n=N*D/d, where d is the diameter of the peripheral dragging means, D is the diameter of the core communicated by the means for sensing. Furthermore, this algorithm transmits the number n to the means for setting so that they trigger dragging the core and stopping at said number n of turns.

The apparatus according to the invention comprises, furthermore, a station 50 for dragging along the longitudinal direction 16 up to a cutting station 30, carrying the connected core portion 1' and core 1 until the front end of the portion 1' has passed the cutting station 30 for a predetermined distance.

A conveyor 50, shown in FIG. 4, comprises two autocentering rollers 53 and 54, for example coated of Vulcolan, mounted on two vertical axes mounted opposite to the core portion 1', operated by a single pneumatic cylinder not shown in the figure. Each roller 53 and 54 is mounted on a respective support arm 51 and 52, rotating about a respective vertical axis 55 and 56. One of the two rollers, for example the roller 54, is driven in a way not shown and the other roller 53 is idle and dragged in rotation by the core 1 that advances. On the idle roller 53 an encoder 58 is mounted that by means of the software controls the movement of the core portion 1' or the core 1 to it connected. On support arm 51 of idle roller 53, in particular, on axis 55, furthermore, a potentiometer is mounted, not shown, with the function to electronic control the chosen diameter of the core. The potentiometer measures the approaching that must be carried out by arm 51 up to contact the core. If the diameter of the core does not correspond to that chosen by the operator the machine is stopped and is an error code is signalled.

The machine according to the invention comprises, furthermore, a cutting station consisting of a rotation unit 30 of the cores and a cutting unit 40, shown in FIG. 4, as well as in FIG. 1. The rotation unit 30 comprises driven rubber roller 31, above described relatively to FIG. 3 for the connecting step, which compresses laterally the core for causing it to rotate both during the cut and during the connecting step. This roller 31 is mounted on a bridge 34 operated by a pneumatic cylinder not shown.

The cutting unit 40 comprises a toothed circular blade 41 operated by an asynchronous motor, not shown, which transmits the movement to the circular blade 41, for example through a belt transmission 44. The cutting unit 40 is mounted on a carriage 43 sliding in a direction 45 transversal with respect to the longitudinal direction 16, operated by a hydraulically controlled speed cylinder not shown. A linear potentiometer not shown controls the position of the carriage 43 and, responsive to the diameter of the core, controls the two speeds, i.e. quick approaching speed and slow cutting speed.

The cutting disc 41 moves in a transversal direction quickly up to a few mm from the core 1 located on the rolling cradle, then the speed is reduced and starts the cut with the core 1 in a rotation opposite to that of disc 41 (disc in clockwise direction and tube in a counter-clockwise direction.) After a rotation of the core of about 380-390° from the beginning of the cutting, the direction of rotation of the core 1 is inverted (disc in counter-clockwise direction and tube in clockwise direction) and the cutting is completed. This particular procedure allows eliminating the cutting defects in the core and giving a cleaner cutting surface.

In case, from the control panel, not shown, the cut is set for cores of different material, for example tubes of PVC instead of tubes of pressed cardboard, the software does not causes reverse rotation of the core, but the tubular core 1 turns always in clockwise direction, since in case of tubes of PVC generally cutting defects are not created.

In cutting station 40, furthermore, nozzles are provided for compressed air jets, not shown in the figure, with the object of assisting the expulsion of short portions of core having cut them, for example of length less than 50 mm, which would cause difficulty of unloading after cutting.

The apparatus according to the invention, comprises sliding abutment means 70, shown in FIG. 1, adapted to provide a stop reference along the longitudinal direction 16 for correcting the arrangement of the core before cutting. The sliding abutment means comprises an abutment element 71 orthogonal to the longitudinal direction 16, mounted on a driven carriage not shown sliding on a guide, in a direction 75 parallel to the longitudinal direction 16. An encoder not shown controls the position of the abutment 71 and allows the system adjusting the distance of the abutment 71 same with respect to the cutting disc 41, i.e. the length of the cut core. The abutment element 71 has a suction opening 72 that is operatively located in an area inside tubular core 1, where this opening 72 is an end of a tube 73 connected to a suction pump not shown. Such a sliding abutment 70, of suction type, thus, is capable of longitudinally positioning in a correct and precise way and at the same time of causing the suction of the chips that derive from the cutting process.

Core 1, after running a cutting cycle, is conveyed by rubber rollers 53 and 54 of conveying station 50 (FIG. 4) with high speed. The encoder, not shown, mounted on the conveying station causes core 1' to move quickly up to the chosen length of cut, stopping a few centimeters before, and then decelerates and brings the core 1 at low speed up to contacting abutment 71. At this point the core is blocked by lowering rubber roller 30 of the cutting station, while the conveying cylinders 53 and 54 are opened and the cutting step starts.

After the cut abutment 71 is withdrawn by a pneumatic cylinder not shown for at least a few centimeters and the cut core length is unloaded. Then, the abutment 71 brought back to the previous position. The withdrawal of abutment 71 is used to assist to discharge the core portion.

Figure 6:
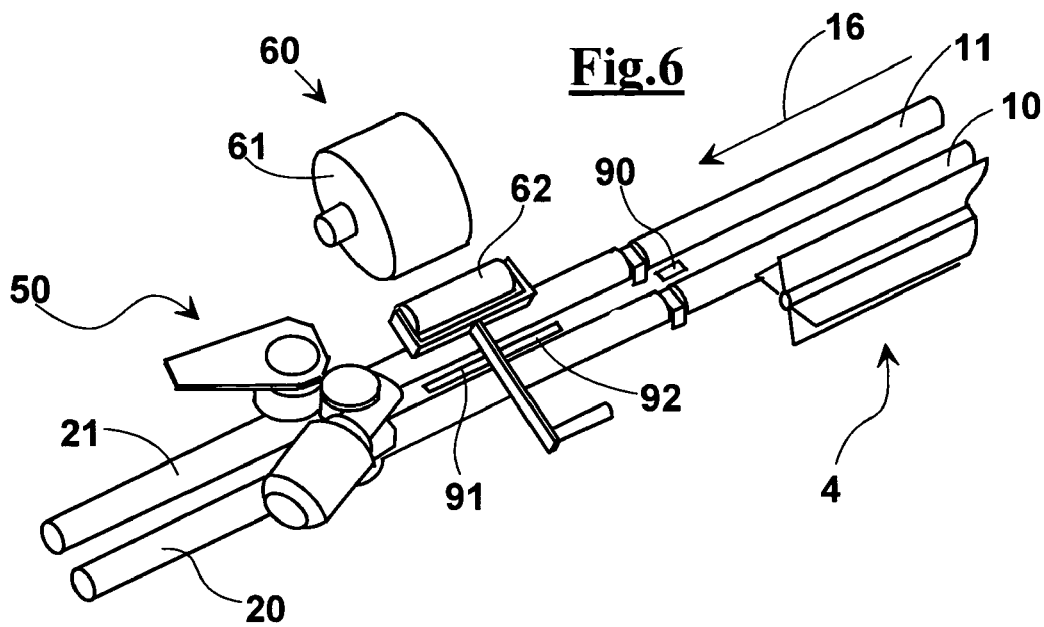
FIG. 6 shows a possible arrangement of proximity sensors along the longitudinal direction.

In FIG. 6 a portion is shown of the machine according to the invention, having a proximity sensor 90 arranged upstream from the connecting station 60 and two sensors 91 and 92 bridging the connecting station 60 same, considering a longitudinal direction of movement that indicated by arrow 16. When sensor 90 is free it detects the absence of the core, and a first tubular core is loaded by the star-shaped supplier 4 (FIG. 1) and falls on rollers 10 and 11 of the rolling cradle of the loading station. The pusher 5, shown in FIGS. 1 and 2, pushes forward the core just loaded up to engage again sensor 1.

Then, the connecting step is carried out as above described, between a new core and the portion remained at the cutting station. Then the connected core starts to be cut and the dragging station is activated until the sensor 91 is not free again. When the sensor 91 is free, the pusher 5 pushes a new loaded core on the cradle until it does not reach the sensor 92, and then the movement of the core is slowed down and the core pushed up to engaging sensor 91.

In this condition the new core is located at a few mm of distance from the core previously arranged on the rolling cradle.

A this point the pusher 5 stops and the core is pushed to contrast the core portion already present on the rolling cradle by approaching pneumatic element 9 mounted on pusher 5. The pneumatic approaching element is operated by a pneumatic piston acting in longitudinal direction. This way a slight push is applied between the previous core and the next core on the rolling cradle, before starting the connecting taping step, and a perfect contact is ensured on the butt joint faces of the two cores in succession. This push is adjustable acting on the pressure of the fluid in the pneumatic circuit that operates the approaching element 9.

Once ended the connection by taping the core joint to previous core is dragged by rollers 53 and 54 of dragging station 50, shown in FIGS. 1, 3 and 5. An encoder 58 mounted on the axis of idle roller 53, shown in FIG. 3, measures the rotation of idle roller 53, allowing the core to follow a predetermined movement, in particular, of a the same length as the length chosen by the operator, reduced of some centimeters.

Then, the speed is slowed down and the core is pushed up to reaching abutment element 71 of FIG. 1.

A this point the rubber roller 31 in cutting station 40, is pressed on the core and the rollers 53 and 54 of the dragging station 50 disengage the core moving away from it. Furthermore, circular blade 41 of cutting station 40, is brought in rotation and is caused to proceed transversally.

The transversal movement of the circular blade is carried out according to a quick approaching movement up to position near the core, and a second, slower, cutting movement. The position of the circular blade is controlled by a linear potentiometer not shown in the figure.

Before completing the cut the speed of rotation of the core is inverted eliminating the cutting defects of the core and providing, thus, a clean cutting surface. For tubular cores of PVC, the speed of rotation is not reversed since it is not necessary.

After the end of cutting, suction abutment 70 of FIG. 1 withdraws by the action of a pneumatic cylinder not shown in figure and the cut tube portion is unloaded lowering one of the rollers of the rolling cradle, in particular, the roller 20 of FIG. 1, allowing to discharge the cut portion.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus for connecting and cutting roll supporting tubular cores, comprising:
    a means for feeding said cores arranged to position one of said cores on a rolling cradle, said core having a front end and a rear end;
    a means for pushing said core along a longitudinal axis along said cradle, said means for pushing acting against said rear end in order to bring said front end in a connecting station, in said connecting station, the rear end of a core portion to connect being arranged;
    a driven peripheral dragging means for causing said core portion to rotate;
    a connecting means present in said connecting station, comprising a supplier of adhesive tape and a transmission roller, which is arranged in such a way that when said peripheral dragging means causes said core and said core portion to rotate about their own axis, said transmission roller maintains the front end of said core and the rear end of said core portion integral to each other and laminates said adhesive tape which is dragged by said core and core portion together to form said joint;
    a conveying means for conveying longitudinally said connected core and core portion along said longitudinal axis up to a cutting station, said conveying means arranged to cause said connected core and core portion to proceed until the front end of said core portion has passed said cutting station for a predetermined distance;
    a cutting means arranged in said cutting station for cutting said core and said core portion connected to each other in order to obtain a core length that is long as said distance;
    wherein a device for transmitting a number of rotations to said core is associated to said peripheral dragging means, said device configured for controlling said peripheral dragging means to cause said core and said core portion to rotate for a predetermined number of turns.

2. The apparatus, according to claim 1, wherein said device for transmitting a number of rotations comprises:
    a means for sensing the diameter of said core; and
    a computing means for computing said predetermined number of turns, responsive to said diameter; and
    a means for setting said peripheral dragging means according to a signal provided by said computing means.

3. The apparatus, according to claim 2, wherein in said computing means a program means is resident which is configured for:
    detecting a number N of layers of adhesive tape to wind about said core joint;
    computing a number n of turns to input in the peripheral dragging means by the equation n=N*D/d, where d is the diameter of the peripheral dragging means, D is the diameter of the core communicated by said means for sensing;
    transmitting said number n to said means for setting so that they trigger dragging the core and stop it to achieve said number n of turns.

4. The apparatus, according to claim 1, wherein said transmission roller in said connecting station is mounted to a support that is arranged to be approached/moved away from said core joint, in particular, said support selected from the group consisting of:
    a driven support, for bringing automatically the transmission roller to contact said core joint;
    a manually operated support, for bringing manually the transmission roller to contact said core joint.

5. The apparatus, according to claim 2, wherein said means for sensing the diameter of said core is selected from the group consisting of:
    a means for reading automatically a measurement of the diameter;
    an acquisition means for acquiring a measurement data of the predetermined diameter;
    a combination of said means for reading automatically and said acquisition means, wherein a testing means is provided for testing whether the predetermined diameter coincides with an automatically read diameter.

6. The apparatus, according to claim 1, wherein said longitudinal conveying means comprises two auto-centering rollers arranged at opposite sides with respect to said core portion, pivotally mounted to respective supports adapted to bring them to close on said core portion pushing laterally said core portion and engaging it, and to bring them to open disengaging it, a first roller of said rollers being a driven roller and a second of said rollers being an idle roller, said supports being arranged to be closed and opened through actuating means, to at least one of said rollers an encoder being associated for measuring precisely the conveying movement for the connecting and/or the cutting steps.

7. The apparatus, according to claim 6, wherein each of said supports is configured to close, pushing laterally said core for engaging it, and to open, for disengaging it, and comprises an arm rotating about an axis, having a free end connected to a respective roller of said rotating rollers, said means for reading automatically a measurement of the diameter of said cores comprising a sensor of angular position, in particular, a potentiometer, mounted to the axis of one of said rotating arms, in particular, said sensor of angular position mounted to the axis of rotation of the rotating arm that holds said idle roller.

8. The apparatus, according to claim 1, wherein an abutment means is provided for stopping the front end of said core portion in a predetermined position when cutting, said abutment means comprising:
    an abutment carriage sliding in longitudinal direction;
    an abutment element mounted to said abutment carriage and arranged perpendicularly to said longitudinal direction;

a means for moving said abutment carriage;

a chip suction means for removing chips produced by cutting, in particular, said suction means comprising a suction duct that has origin in an opening suction on said abutment element.

9. The apparatus, according to claim 1, wherein said means for feeding said cores comprises:

an elongated shaft with star-shaped cross section extending along an axis of rotation parallel to said longitudinal axis, said star-shaped shaft comprising at least three continuous radial protrusions, in particular said continuous protrusions extending for all the length of said star-shaped shaft and being in number of four arranged in succession with facing ends at a right angle to each other;

a motor means for causing said star-shaped shaft to rotate about said axis of rotation.

10. The apparatus, according to claim 1, wherein said means for pushing said cores longitudinally along said cradle comprises:

a sliding driven carriage that is arranged to slide along the longitudinal axis of said cores, said carriage carrying out a first approaching stroke;

an approaching device that is arranged to operatively contact the rear end of said core and mounted to said carriage, comprising an actuator that is movable with respect to said carriage along said longitudinal axis for carrying out a further approaching fine stroke.

11. The apparatus, according to claim 10, wherein said approaching device comprises at least two aligned small idle rollers having an axis of rotation perpendicular to the longitudinal axis of said cores, said rollers being operatively in contact with said rear end.

12. The apparatus, according to claim 1, wherein a means is provided for pushing said core against said rolling cradle, comprising a vertical pushing device acting against said core opposite to said cradle, in particular, said pusher mounted to said driven carriage, in particular, said vertical pushing device comprising:

a fork sliding radially with respect to the core having a free end oriented towards the core, said free end comprising at least two small idle rollers that can be brought in rotation by the rotation of said core;

a motor means for moving radially said fork.

* * * * *